(12) United States Patent
Bakow et al.

(10) Patent No.: US 7,174,551 B2
(45) Date of Patent: Feb. 6, 2007

(54) MULTIPLE TASK WAIT SYSTEM FOR USE IN A DATA WAREHOUSE ENVIRONMENT

(75) Inventors: Linnette Bakow, Santa Cruz, CA (US); Shannon Matthew Farrington, Gilroy, CA (US); Diane Friedman, Chico, CA (US); Tom William Jacopi, San Jose, CA (US); Jacques Joseph Labrie, Sunnyvale, CA (US); Thanh Vu Nguyen, San Jose, CA (US); Cheung-Yuk Wu, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 10/151,381

(22) Filed: May 20, 2002

(65) Prior Publication Data

US 2003/0217089 A1    Nov. 20, 2003

(51) Int. Cl.
   *G06F 9/46*    (2006.01)
(52) U.S. Cl. .................................. 718/100; 718/107
(58) Field of Classification Search ............... 718/100, 718/107
   See application file for complete search history.

(56) References Cited

U.S. PATENT DOCUMENTS 4,933,940 A * 6/1990 Walter et al. ................. 714/10

(Continued)

FOREIGN PATENT DOCUMENTS

CA    2280278    2/2001

(Continued)

OTHER PUBLICATIONS

"Method for Network-Aware, Asynchronous, Process-Completion, Notification," Research Disclosure, Dec. 1999, p. 1670.

(Continued)

*Primary Examiner*—Meng-Ai T. An
*Assistant Examiner*—Kenneth Tang
(74) *Attorney, Agent, or Firm*—Samuel A. Kassatly

(57) ABSTRACT

A multiple task wait system and associated method allow a client application to wait for multiple tasks to be successfully or conditionally implemented before running subsequent tasks. Two mechanisms can be used to accomplish this multiple wait process: The first mechanism uses a multi-wait grouping process that is visible to the client, and the second mechanism uses a graphical representation to identify the tasks to be completed. The multi-wait grouping process allows a client to group a related set of tasks together for both control and documentation purposes. The client can add as many tasks as the resources of the computer allow to a group while defining the data flows and control flows between the tasks in the group using various graphical tools. The multi-wait system allows the client to define the constraints and conditions for a set of tasks to be considered complete, and further allows the system to define the constraints and conditions for considering all the tasks within the group to be completed. By utilizing the group concept, the system can selectively control the tasks to be included in the completion decision based on predefined rules.

28 Claims, 5 Drawing Sheets

U.S. PATENT DOCUMENTS

| | | |
|---|---|---|
| 5,828,881 A | 10/1998 | Wang .......................... 395/680 |
| 6,658,448 B1 * | 12/2003 | Stefaniak et al. ........... 718/104 |
| 6,678,714 B1 * | 1/2004 | Olapurath et al. .......... 718/104 |
| 6,848,104 B1 * | 1/2005 | Van Ee et al. ............... 719/310 |
| 2001/0051971 A1 | 12/2001 | Kato .......................... 709/102 |

FOREIGN PATENT DOCUMENTS

| | | |
|---|---|---|
| GB | 2321544 | 7/1998 |
| JP | 11234753 A | 8/1999 |
| JP | 2001229043 A | 8/2001 |
| KR | 1996-008560 | 1/1996 |

OTHER PUBLICATIONS

R.G. Mustain et al., "Virtual List Multiple Event Wait," IBM Technical Disclosure Bulletin, vol. 21, No. 5, Oct. 1978.

R.L. Obermack, "Deadlock Detection for all Resource Classes," IBM Technical Disclosure Bulletin, vol. 22, No. 11, Apr. 1980.

* cited by examiner

MULTIPLE TASK WAIT SYSTEM FOR USE IN A DATA WAREHOUSE ENVIRONMENT

FIELD OF THE INVENTION

The present invention generally relates to the field of data processing and particularly to a method and system for multi-scalar data processing, managing multiple tasks in one or more job threads. More specifically, this invention describes a system and a method that implement a design to wait for multiple tasks to complete prior to implementing a new task in a data warehouse environment. The system can use a logical grouping implementation or a graphical representation for control and documentation purposes.

BACKGROUND OF THE INVENTION

In a data warehouse environment, a task is the smallest entity that can be run as a single unit. Clients in the data warehouse environment often need to run Extraction/Transformation/Loading (ETL) tasks in one or more job threads. Each job thread usually contains a group of related tasks that must be completed before the next group of tasks can be started, so that the waiting tasks in the next group will not run multiple times.

A task is responsible for data extraction, transformation, and loading to the data warehouse. Clients usually have a group of tasks to perform on a regular basis. As an example, a client (or client application) may have three regions to account for and manage: Western, Eastern, and Central regions. The data for each region is distributed into databases. The client wishes to build a data warehouse for the transaction data collected during the day. Data must be pulled from each region, mapped, and processed. The results are then stored in the data warehouse. If the results of the Western region transactions depend on those of the Eastern region, the Eastern region data must be processed first and a dependency must be built into the processing instructions.

The client needs to carefully plan and manually link these related tasks in a group or across related groups with the required run conditions to keep from loading the data warehouse with redundant data. Grouping of tasks becomes a very tedious, manual task for the client, which is rendered even more complicated when groups of tasks are scheduled to run with multiple overlapped schedules.

Data warehouse clients need a relatively easy way to use a graphical client interface that allows them to group related tasks with predetermined run conditions and to run the grouped tasks automatically without running the same tasks multiple times. The need for such a system has heretofore remained unsatisfied.

SUMMARY OF THE INVENTION

The multiple task wait system and method of the present invention satisfy this need by allowing the client (or client application) to wait for multiple tasks (also referred to herein as "multiple wait") to be successfully or conditionally implemented before running the next task (or tasks). Two mechanisms can be used to accomplish the multiple wait process: The first mechanism uses a multi-wait grouping process that is visible to the client, and the second mechanism uses a graphical representation to identify the tasks to be completed.

The multi-wait grouping process allows a client to group a related set of tasks together for both control and documentation purposes. The client can add as many tasks as the resources of the computer allow to a group while defining the data flows and control flows between the tasks in the group using various graphical tools. With the control flows, the client can link tasks together such that when one or more tasks are completed (on success, failure, or unconditionally), a follow-on task can be started. The tasks linked via control flows can be linked (i.e., drawn, connected and extended) to other tasks within this group or in a different multi-wait group. The multi-wait groups also provide a mechanism to allow a set of requirements (e.g., schedules for tasks to start or notifications when tasks are completed) to be added to all the tasks within that group.

Utilizing the multi-wait group concept for multiple wait allows the client to define the constraints and conditions for a set of tasks to be considered complete. The multi-wait group concept also allows the present system and associated method to define the constraints and conditions for considering all the tasks within the group to be completed. By utilizing the group concept, the present system and method can selectively control the tasks to be included in the completion decision based on predefined rules embedded in the system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Instance: In object-oriented technology, a member of a class; for example, "Lassie" is an instance of the class "dog." When an instance is created, the initial values of its instance variables are assigned.

Internet: A collection of interconnected public and private computer networks that are linked together with routers by a set of standards protocols to form a global, distributed network.

SQL: Structured Query Language, a standardized query language for requesting information from a database.

Figure 1:
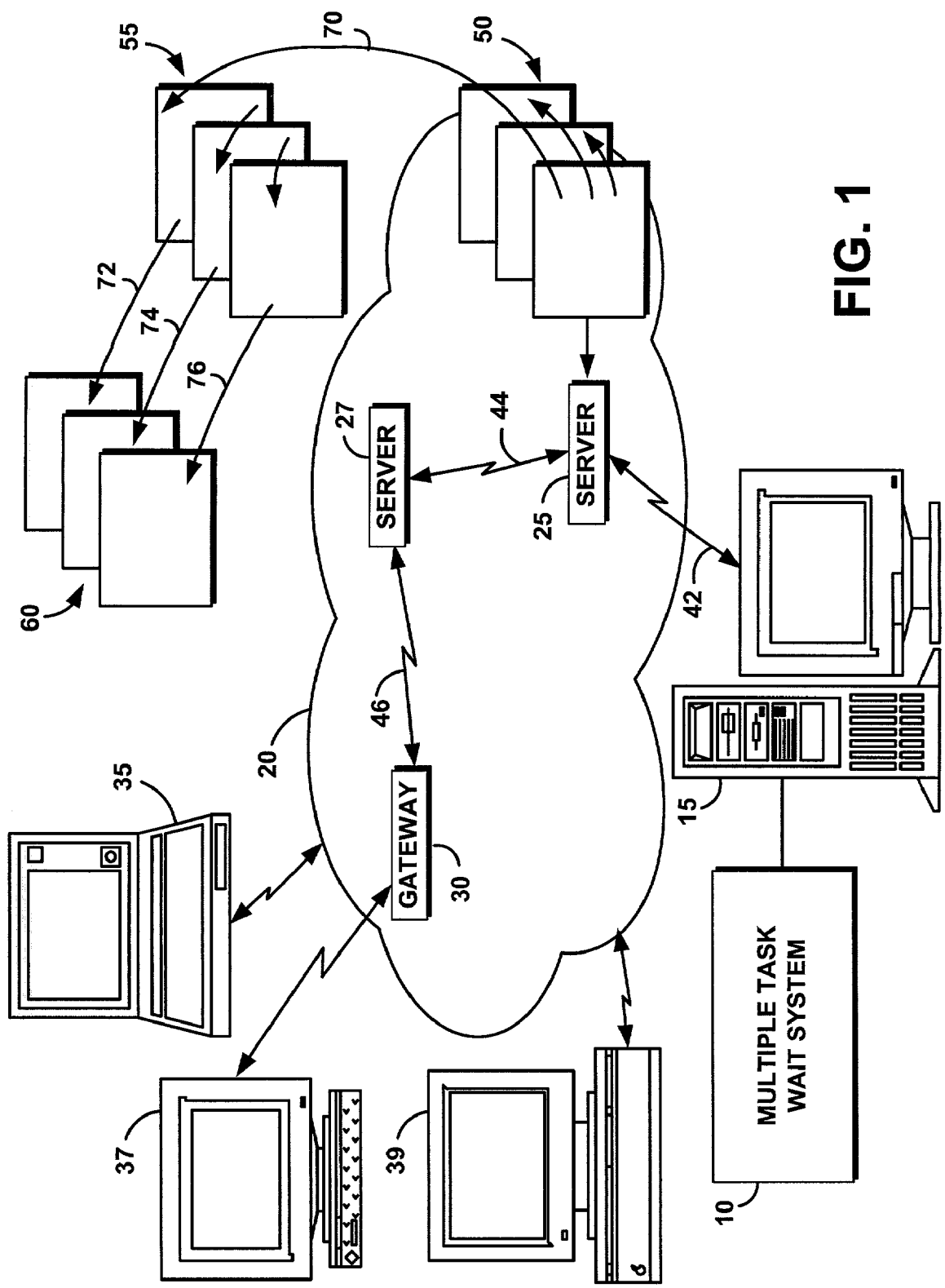
FIG. 1 is a schematic illustration of an exemplary operating environment in which a multiple task wait system of the present invention can be used.

FIG. 1 portrays the overall environment in which a multiple task wait system 10 of the present invention may be used in a data warehouse environment. System 10 includes a software or computer program product that is typically embedded within or installed on a host server 15. Alternatively, the system 10 can be saved on a suitable computer usable medium such as a diskette, a CD, a hard drive, or like storage devices. While system 10 will be described in connection with a data warehouse environment or the World Wide Web (WWW), the system 10 can be used with a stand-alone database of documents or other text sources that may be derived from the WWW or other sources using wireless or cable connections.

The cloud-like communication network 20 is comprised of communication lines and switches connecting servers such as servers 25, 27, to gateways such as gateway 30. The servers 25, 27 and the gateway 30 provide the communication access to the WWW Internet. Clients, such as remote Internet clients are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
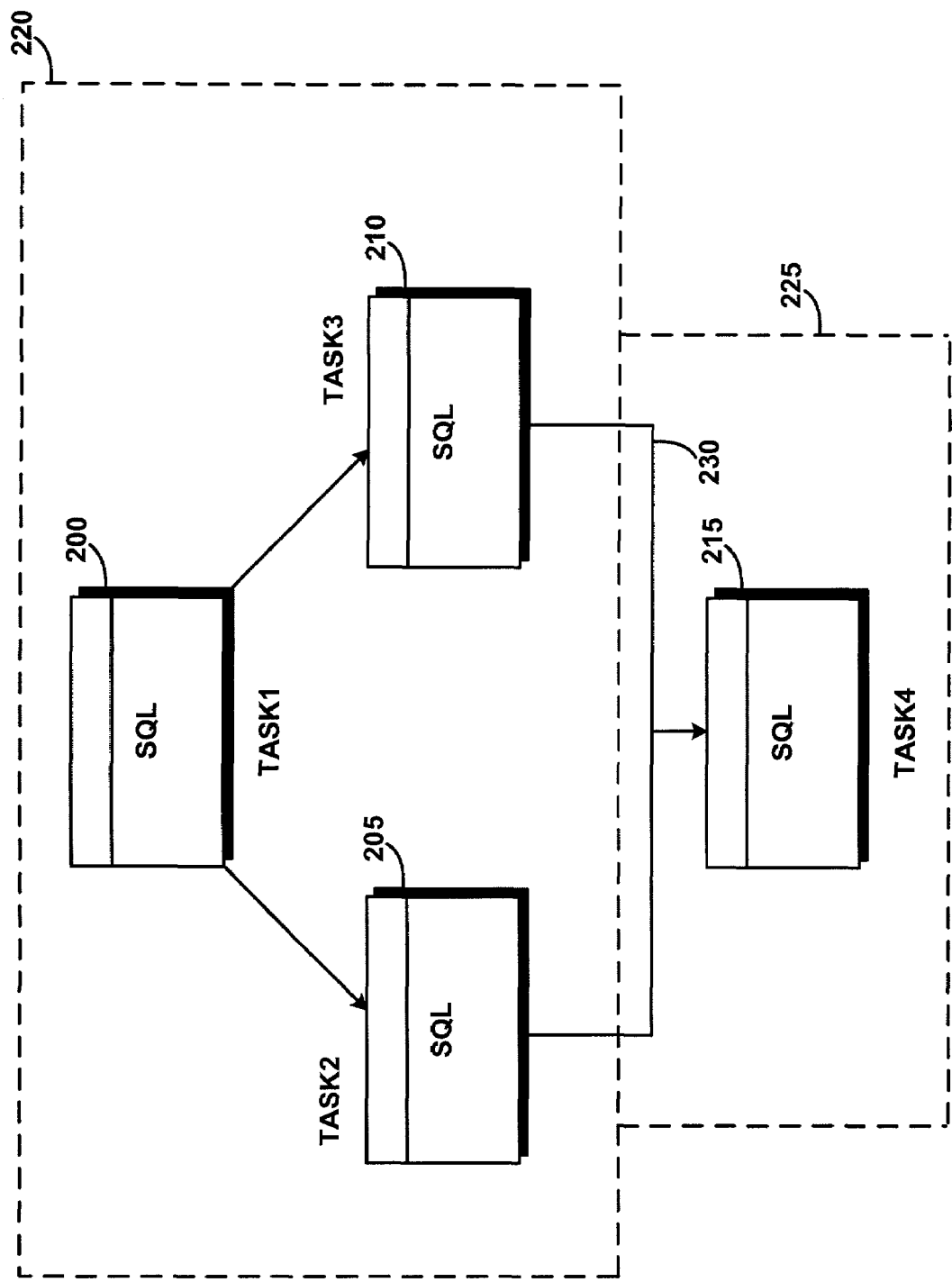
FIG. 2 is an exemplary graphical illustration of a multiple wait relationship processed by the multiple task wait system of FIG. 1.

System 10 includes an editor that graphically displays task flow relationships between tasks. An exemplary series of tasks as displayed by system 10 is illustrated in FIG. 2. As a data warehouse performs a series of tasks, Task1 200 is completed first, and then both Task2 205 and Task3 210 are completed before Task4 215 is started.

The order of completion for Task2 205 and Task3 210 may not be significant. However, both tasks must be completed before Task4 215 can be started. Task1 200 is referred to herein as a predecessor task while Task2 205 and Task3 210 are referred to as successor tasks. If, as illustrated in FIG. 2 the tasks Task1 200, Task2 205, and Task3 210 are related, the client can group them into a predecessor Group220 and a successor Group225 where the successor Group225 has to wait for the predecessor Group220 to complete. The client introduces a joint link from the predecessor Group220 to the successor Group225. The joint link is a graphical instruction allowing the client to instruct the data warehouse that the successor Group225 has to wait for the predecessor Group220 to complete. As used herein, completion is based on any one or more of the following three conditions: success, failure, or unconditional.

System 10 provides two different techniques for creating a multiple wait using a graphical interface. With the first technique, the client draws a task flow line from Task2 205 to Task4 215. Next, the client draws a line from Task3 210 to the task flow line previously drawn from Task2 205 to Task4 215. System 10 places a "connector" where the task flow lines join and the lines are connected. With the second technique, the client first draws the task flow line from Task2 205 to Task4 215 and then draws a task flow line from Task3 210 to Task4 215. The client then selects both task flow lines, brings up a popup menu for the lines provided by system 10 and selects a menu choice that will combine the lines.

To start the implementation of the successor Group225, system 10 must be able to determine that the predecessor Group220 has completed, and to determine the status of that completion. To this end, system 10 uses "exit criteria" to evaluate the group control flow condition. The exit process and related criteria will be described later in more detail. A group may contain multiple tasks in different run modes. A scheduled group is considered enabled so that only the tasks in the ready-to-run mode will be executed.

A group may have multiple job threads of tasks, wherein each job thread may have multiple branches. The task control flow condition can be on success, on failure or on completion (i.e., unconditional). Multiple task control flow conditions can be defined between two tasks in a given job thread. System 10 may not execute some of the tasks in the job thread branches if task control flow conditions are not met. The exit criteria must be able to dynamically determine if the task flow conditions occur, and to handle those tasks that do not meet the task flow conditions. A task in the job thread can also have multiple predecessor tasks or multiple task control flow conditions. Consequently, the exit criteria are able to count all the predecessor tasks before running the successor tasks to guarantee a meaningful run.

Furthermore, clients can schedule a group to run at a certain interval or specific time. This schedule for the group will apply to all the tasks in the group. Therefore, the root tasks of all the job threads in the group must observe this group schedule. However, these root tasks may have predecessor tasks originating from other groups. The successor tasks of the terminal tasks in the current group may also reside in another group. The exit criteria must be able to determine the root tasks and terminal tasks for a given group, in order to calculate the final completion status of the predecessor group, i.e., 220. The terminal task is the last task in each job thread, and it is the last executed task that does not have a successor task to trigger in the same job thread, This final completion status will then be used to determine if the successor group, i.e., 225, should be executed. The execution of the successor group can be conditional, on success or on failure, or unconditional completion.

Figure 3:
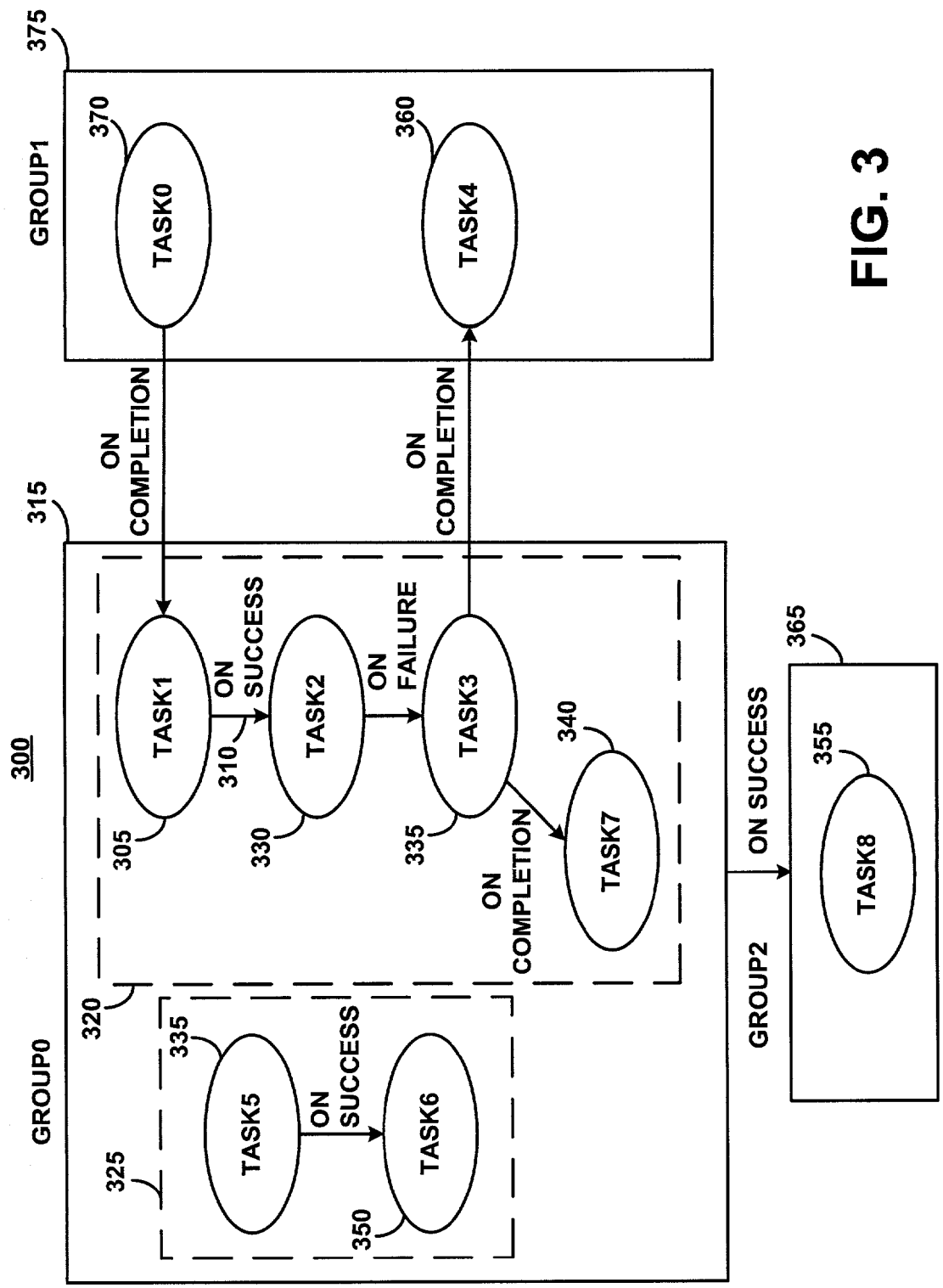
FIG. 3 illustrates a first example showing two groups, Group0 and Group1, wherein Group0 contains a plurality of cascade tree tasks and branch tree nodes.

Exit criteria requirements can be illustrated by examining two examples of possible grouping of the job threads. FIG. 3 shows a first example 300, illustrating a group, Group0 315, with multiple cascade task trees and branch tree nodes. Joint links between tasks are represented by arrows such as link 310. Group0 315 includes two job threads: job thread 320 and job thread 325. Job thread 320 includes four tasks; Task1 305, Task2 330, Task3 335, and Task7 340. Job thread 325 includes two tasks, Task5 335 and Task6 350. Job threads 320 and 325 are grouped into Group0 315, but are not connected. The successor Group2 365 contains Task8 355 that has a dependency on the completion of both of job threads 320, 325 in the predecessor Group0 315.

System 10 manages the execution of the various tasks through a set-up phase, behavior definition, and exit criteria. The setup phase for Group0 315 includes the following steps:

System 10 schedules and enables Group0 315 and promotes all tasks to ready-to-run mode;

Group0 315 uses Task1 305, Task2 330, Task5 345, Task6 350, and Task7 340 to determine exit criteria;

System 10 defines the root tasks of Group0 315 as Task1 305 and Task5 345; and System 10 determines the terminal tasks for Group0 315 as Task5 335, Task6 350, Task7 340, Task1 305 and Task2 330. The terminal task is not predetermined, as the last executed task in a job thread is considered to be the terminal task. As an example, if Task1 305 fails, Task1 305 is considered to be the terminal task in job thread 320; if Task1 305 and Task2 330 are executed successfully, Task2 330 is considered to be the terminal task.

System 10 defines the behavior of Group0 315 as follows:

Task1 305 will run once by the cascade link of Task0 370 on completion, but the status of Task0 370 will not influence the exit status of Group0 because Task0 is not physically defined in Group0.

Task4 360 will be run once by the cascade link of Task3 335 on completion; but the status of Task4 will not influence the exit status of Group0 because Task4 is not physically defined in Group0.

Task7 340 will always be run if Task1 305 is completed successfully and Task2 330 fails. Task2 330 will always run if Task1 305 is completed successfully.

Task6 350 will always be run if Task5 345 is successful; and

Task3 335 will be run only if Task1 305 is successful and Task2 330 fails.

Two criteria for Group2 330 to run upon the successful completion of Group0 315, for the example 300 of FIG. 3, are as follows:

Task6 350 and Task2 330 complete successfully; or

Task6 350, Task7 340, Task1 305 is completed successfully, and Task2 330 fails.

Figure 4:
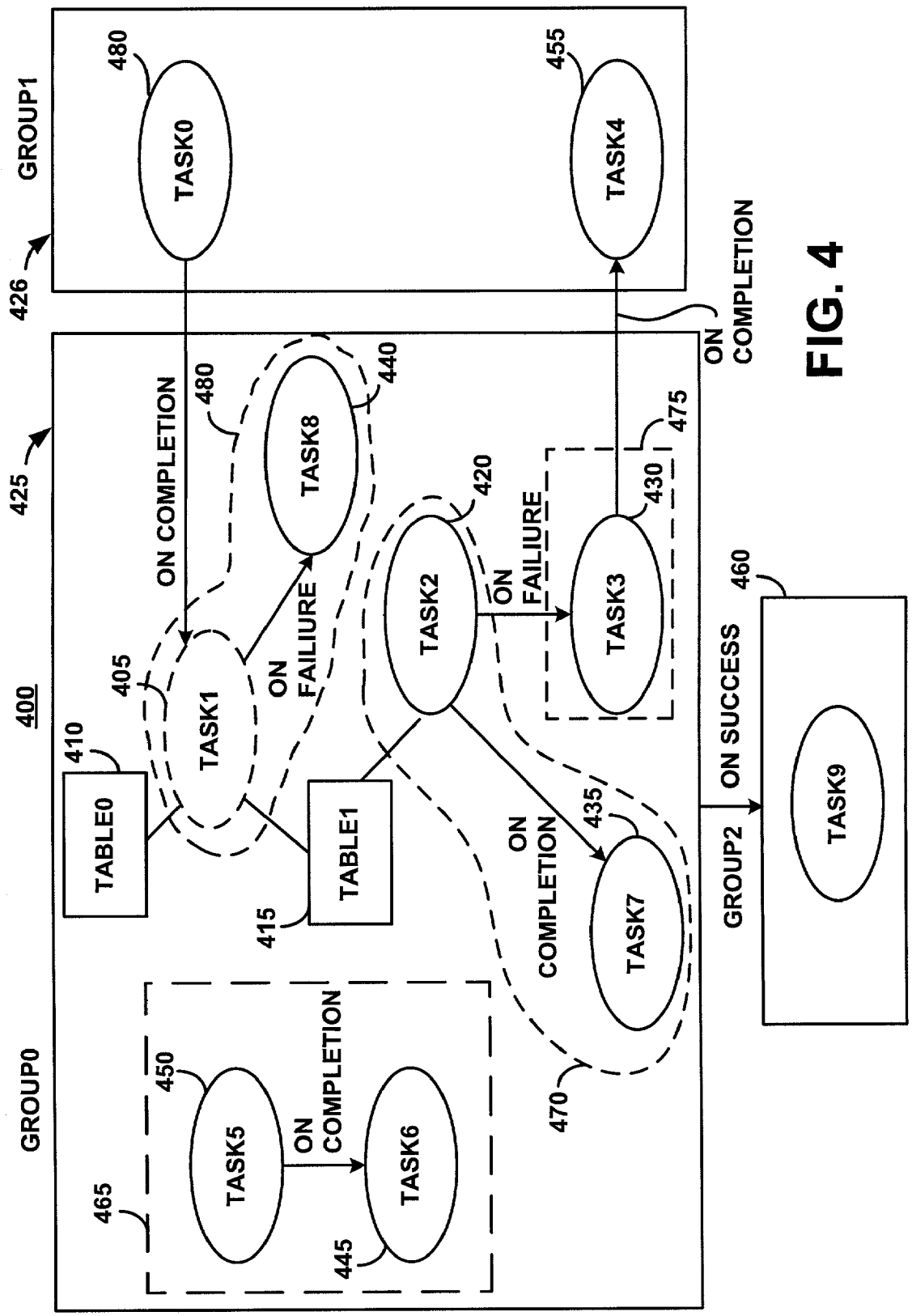
FIG. 4 illustrates a second example showing two groups, Group0 and Group1, wherein Group0 contains a root transient task.

Referring now to FIG. 4, it illustrates another example 400. For illustration purposes, the structure of the task flow is similar to example 300 of FIG. 3, except that Task1 is a transient step to Task2 420. As described earlier, system 10 manages the set-up phase, defines the behavior of the process, and determines the exit criteria based on client input. However, Task1 405 in example 400 is a transient task to Task2 420 because of the data dependency between Task1 405 and Task2 420, and is shown in a dashed line.

System 10 extracts and transforms the data in Table0 410 to create Table1 415. Table1 415 exists only as long as needed to complete Task2 420. While in the example FIG. 3 each task has a task-to-task relationship, there is no predefined task-to-task relationship between Task1 405 and Task2 420 and therefore Task1 405 can never directly run Task2 420. On the contrary, Task1 405 can trigger Task8 490 on failure because there is a task-to-task relationship defined between them, but there is no data dependency between these two tasks.

Since the data generated by Task1 405 is not persistent and the generated data is used by Task2 420, Task1 405 cannot be used as a root task in the job thread containing Task 2 420. The requirements for a task to be a root task are as follows:
1. The task must not have a predecessor task within the same group;
2. The task must be physically defined to the current group;
3. The task must be in a ready-to-run mode; and
4. The task must be a task that produces persistent warehouse data or has data dependency from the predecessor task.

Task1 405 will not run until TASK0 480 is complete. However, Task1 405 resides in Group0 425 and TASK0 480 resides in Group1 426. Consequently, pursuant to the rules above, TASK0 480 is not a root task for job thread containing Task8 440.

The setup phase for Group0 425 includes the following steps:

System 10 schedules and enables Group0 425 and promotes all tasks to the ready-to-run mode;

System 10 defines Task5 450, Task1 405, and Task2 420 as the root tasks;

System 10 determines that Task8 440 is not a root step because there is no data dependency between Task1 405 and Task8 440, and thus, Task8 440 does not consider Task1 405 as a transient step; and The terminal tasks in each job thread are determined dynamically, for example, system 10 may determines at execution time that the terminal tasks as Task6 445, Task7 435, Task3 430, and Task8 440.

System 10 defines the behavior of Group0 425 as follows:

For Task2 420 to be run, system 10 executes Task1 405 before Task2 420 in order to generate the transient Table1 415 with current data for Task2 420 to use, but is not used to determine the exit status of Group0 425.

Task4 455 will be run once by the cascade link of Task3 430 on completion.

Task7 435 will always be run if Task1 405 is completed successfully.

Task6 445 will always be run.

Task8 440 will be run if Task1 405 fails.

Task3 430 will be run only if Task1 405 is successful and Task2 420 fails.

The criteria for Group 2 to run upon successful completion of Group 0, for the example 400 of FIG. 4 for Group2 460 to start, are as follows:

Task6 445 and Task7 435 and Task1 405 complete successfully or

Task6 445 and Task7 435 and Task1 405 complete successfully, and Task2 420 fails but Task3 430 is completed successfully Task6 445 and Task7 435 complete successfully, and Task1 405 fails but Task8 440 completed successfully.

Once system 10 has defined the root tasks, each root task represents the beginning of a job thread. In FIG. 4, Task2 420, Task5 450, and Task1 405 are root tasks. System 10 begins monitoring the execution of these initial job threads. Each job thread can branch and multiply. As an example, Task2 420 branches into two tasks: Task3 430 and Task7 435, creating more job threads to monitor and to manage in Group0 425.

System 10 manages each branch because as soon as a job thread terminates, the last task executed in each job thread is used to calculate the final group execution status (or completion status). In example 400, job thread 465 contains Task5 450 and Task6 445. When Task5 450 is completed, system 10 executes Task6 445. At the successful completion of Task6 445, the job thread execution status is successful for job thread 465.

Job thread 470 contains Task2 420 and Task7 435. When Task1 405 and Task2 420 are completed, system 10 executes Task7 435. At the successful completion of Task7 435, the job thread execution status is successful for job thread 470.

A task is not included in more than 1 job thread and it is run once. Therefore, if a task has two or more successor tasks, the first successor task will remain in the same job thread, and the second (and the other successor tasks) will start a new job thread (or threads). Job thread 475 includes Task3 430. Since Task3 430 is executed on failure of Task2 420 and successful completion of Task1 405, job thread 475 is successful only if Task3 430 completes successfully.

Job thread4 480 includes Task1 405 and Task8. If Task1 405 is completed successfully, or if Task1 405 fails with Task 8 completed successfully, then Group0 425 is also completed successfully. For the purposes of illustration in these examples, system 10 considers an entire group as having one or more job threads fail.

Task2 420 has an ON COMPLETION branch and another ON FAILURE branch. Task2 420 is included in job thread 420. Task2 420 will only be executed once, and the branch will take place only after the completion of the Task2 420. The definition of failure for a group can be customized by the client.

Figure 5:
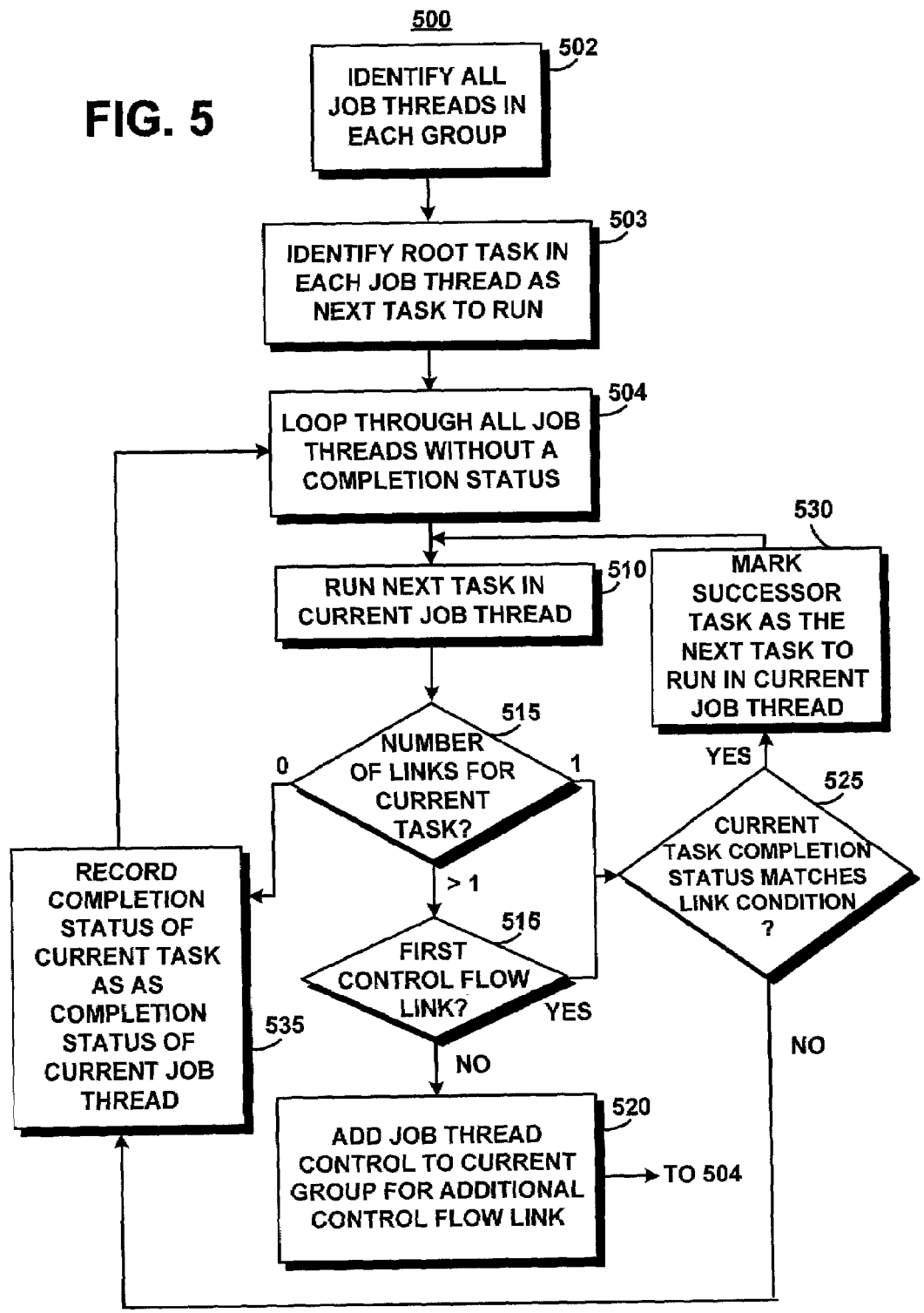
FIG. 5 is a process flow chart illustrating an exit method for the multiple task wait system of FIG. 1.

The performance of system 10 is also described by method 500 of FIG. 5. In operation, and with further reference to FIG. 4, system 10 first identifies at step 502, all the job threads in each group, i.e., Group0 425 of example 400, so that the eligible tasks in the same thread can start execution. A group may have multiple job threads. Each job thread may contain one or more tasks. For performance reasons, some data warehouse clients choose to have a temporary task to produce transient (i.e., non persistent, temporary, or staging) data that will be deleted when it is not needed.

Once all the job threads are identified at step 502, system 10 identifies, at step 503, the root task in each job thread as the next task to run in each job thread. At step 504, system 10 loops through all the job threads that do have not a completion status. If all the job threads are completed, system 10 calculates the final group exit status. The exit criteria for a group do not simply use the beginning task of each job stream as the root task because the beginning task may have a predecessor task physically defined outside of the current group or it may not be persistent.

At step 510, system runs the next task in the current job thread. For example, system 10 will run Task5 450 and check the status of that task. Based on the completion status of Task5 450, system 10 will check the link relationship. Once the predecessor task such as Task5 450 is completed, system 10 follows the task link to Task6 445. These root tasks in the same group will carry the same run schedule specified by the user for the group. The schedule associated with each individual task is not applicable when system 10 runs the group.

System 10 then checks, at step 515, the number of links the current task has; i.e., whether the current task has a successor task. In the case of Task5 450, one link exists to Task6 445, and system 10 checks to determine if the current task completion status matches the required link condition at step 525. In this example, system 10 inquires if Task5 450 has completed. If so, system 10 continues to step 510 and executes the successor step, step6 445, and repeats steps 515 through 510 as long as each task completes successfully until the job thread is completed, in this case, job thread 465.

If system 10 determines, at step 515, that there is more than one link for the current task being run, it proceeds to step 516, where for the first control flow link, it proceeds to decision step 525 as explained earlier. Otherwise, for any subsequent control flow link, system 10 identifies the successor task as the current task in the new job thread and proceeds to step 520.

At step 520, system 10 adds a new job thread to the current group for the additional control flow link and proceeds to step 504. For example, Task2 420 has two links. System 10 adds job thread 475 to Group0 425 at step 520. Job thread 470 contains Task2 420 and Task7 435 while job thread 475 contains only Task3 430. The task execution of job thread 470 then continues looping through steps 525, 530, 515, as described earlier.

When system 10 determines at step 515 that no more links exist for the current task (value=0), it proceeds to step 535 where it records the completion status of the current task as the completion status of the current job thread, and then proceeds to step 504. Each set in the group may have multiple branch nodes causing more threads of execution to be created and managed. When all these threads of execution are completed, the group is completed.

System 10 calculates the exit status of the group based on the last executed task in each thread. For simplicity, if one or more of the last executed task fails, the group fails. The client may further define the rules for calculating the final group return status. The last executed task in a thread of execution must satisfy the following conditions:

1. It has no successor task that is ready-to-run and is physically defined in the current group; and
2. it has no matching condition to cascade down to the successor task that is ready-to-run and is physically defined in the current group.

When a task fails, it may have a cascade on failure link to the successor task. If the successor task is the last task in the thread of execution and it completes successfully, system 10 considers this thread of execution successful.

It is to be understood that the specific embodiments of the invention that have been described are merely illustrative of certain application of the principle of the present invention. Numerous modifications may be made to the wait for multiple tasks before running the next task invention described herein without departing from the spirit and scope of the present invention. Moreover, while the present invention is described for illustration purpose only in relation to mapping data from one database to another, it should be clear that the invention is applicable as well to any collection of data or databases accessible either through an internet, intranet connection, or any other link.

What is claimed is:

1. A processor-implemented method for multi-scalar data processing that manages multiple tasks in at least one job thread, comprising:
    grouping a set of related tasks in a group;
    defining data and control flows between the related tasks in the group;
    waiting for any of a complete or partial implementation of multiple predecessor tasks that form a subset of the related tasks in the group, based on the data and control flows, for executing a successor group comprised of multiple successor tasks, wherein the successor group succeeds the group;
    defining exit conditions for the group;
    upon satisfaction of the group exit conditions, selectively implementing at least one of a plurality of related successor tasks grouped in the successor group;
    wherein grouping the set of related tasks comprises identifying all job threads in the group, so that eligible tasks in a job thread can start execution; and
    wherein grouping the set of related tasks comprises identifying a root task in the job thread as a subsequent task to run in the job thread.

2. The method according to claim 1, wherein defining the control flows comprises defining when a follow-on task can be started.

3. The method according to claim 2, wherein tasks linked via the control flows are linked to other tasks within the group.

4. The method according to claim 2, wherein defining control flows that link tasks so that when one or more tasks are completed comprises defining a success completion status.

5. The method according to claim 2, wherein defining control flows that link tasks so that when one or more tasks are completed comprises defining a failure completion status.

6. The method according to claim 2, wherein defining control flows that link tasks so that when one or more tasks are completed comprises defining a conditional completion status.

7. The method according to claim 2, wherein defining control flows that link tasks so that when one or more tasks are completed comprises defining an unconditional completion status.

8. The method according to claim 1, wherein defining exit conditions for the group comprises defining constraints for considering all the tasks within the group to be completed.

9. The method according to claim 1, wherein grouping the set of related tasks comprises grouping the tasks in a data warehouse environment.

10. The method according to claim 1, wherein upon completion of all the job threads, calculating a group exit status; and comparing the calculating group exit status to the defined group exit conditions to determine whether the group exit conditions are satisfied.

11. The method according to claim 10, wherein calculating the group exit status comprises checking a completion status of a last executed task in the job thread.

12. The method according to claim 1, wherein waiting for the implementation of at least one successor task comprises waiting for a successful completion of at least one successor task.

13. The method according to claim 1, wherein waiting for the implementation of at least one successor task comprises waiting for a conditional of at least one successor task.

14. A computer program product having a plurality of program codes stored on a processor-useable medium, for multi-scalar data processing that manages multiple tasks in at least one job thread, comprising:
  a program code for grouping a set of related tasks in a group;
  data and control flows defined between the related tasks in the group;
  a program code for waiting for any of a complete or partial implementation of multiple predecessor tasks that form a subset of the related tasks in the group, based on the data and control flows, for executing a successor group comprised of multiple successor tasks, wherein the successor group succeeds the group;
  upon satisfaction of the group exit conditions, a program code selectively implements at least one of a plurality of related successor tasks grouped in the successor group;
  wherein the program code for grouping the set of related tasks identifies all job threads in the group, so that eligible tasks in a job thread can start execution; and
  wherein the program code for grouping the set of related tasks further identifies a root task in the job thread as a subsequent task to run in the job thread.

15. The computer program product according to claim 14, wherein the control flows define when a follow-on task can be started.

16. The computer program product according to claim 15, wherein tasks linked via the control flows are linked to one or more other tasks within a different group.

17. The computer program product according to claim 15, wherein the control flows link tasks so that when one or more tasks are completed based on a success completion status.

18. The computer program product according to claim 15, wherein the control flows link tasks so that when one or more tasks are completed based on a failure completion status.

19. The computer program product according to claim 15, wherein the control flows link tasks so that when one or more tasks are completed based on a conditional completion status.

20. The computer program product according to claim 15, wherein the control flows link tasks so that when one or more tasks are completed based on an unconditional completion status.

21. The computer program product according to claim 14, wherein the exit conditions for the group comprises constraints for considering all the tasks within the group to be completed.

22. The computer program product according to claim 14, wherein a group exit status is calculated by checking a completion status of a last executed task in the job thread.

23. The computer program product according to claim 14, wherein the program code for waiting waits for the implementation of a successful completion of at least one successor task.

24. The computer program product according to claim 14, wherein the program code for waiting waits for the implementation of a conditional completion of at least one successor task.

25. A processor-implemented system for multi-scalar data processing that manages multiple tasks in at least one job thread, comprising:
  means for grouping a set of related tasks in a group;
  data and control flows defined between the related tasks in the group;
  means for waiting for any of a complete or partial implementation of multiple predecessor tasks that form a subset of the related tasks in the group, based on the data and control flows, for executing a successor group comprised of multiple successor tasks, wherein the successor group succeeds the group
  means for selectively implementing at least one of a plurality of related successor tasks grouped in the successor group upon satisfaction of the group exit conditions;
  wherein the means for grouping the set of related tasks comprises means for identifying all job threads in the group, so that eligible tasks in a job thread can start execution; and
  wherein the means for grouping the set of related tasks comprises means for identifying a root task in the job thread as a subsequent task to run in the job thread.

26. The system according to claim 25, wherein the control flows link tasks so that when one or more tasks are completed based on any one of:
  a success completion status;
  a failure completion status;
  a conditional completion status; or
  an unconditional completion status.

27. The system according to claim 26, wherein the exit conditions for the group comprises constraints for considering all the tasks within the group to be completed.

28. The system according to claim 27, wherein a group exit status is calculated by checking a completion status of a last executed task in the job thread.

* * * * *